United States Patent
Dauffenbach et al.

[11] Patent Number: 5,551,900
[45] Date of Patent: Sep. 3, 1996

[54] AQUATIC VEGETATION CUTTER

[76] Inventors: John R. Dauffenbach, 608 Lake St., Waukesha, Wis. 53186; David D. Dauffenbach, 432 W. Walnut Dr., Sturgeon Bay, Wis. 54235; James M. Dauffenbach, 1421 Victoria Dr., Waukesha, Wis. 53186

[21] Appl. No.: 437,032

[22] Filed: May 8, 1995

[51] Int. Cl.⁶ .................................................. B63H 21/12
[52] U.S. Cl. ................................ 440/111; 56/8; 114/63; 440/79
[58] Field of Search ........................ 56/8, 9; 29/252; 440/111, 112, 73, 61, 79; 114/26, 63

[56] References Cited

U.S. PATENT DOCUMENTS

| | | | |
|---|---|---|---|
| 2,546,353 | 3/1951 | Williamson | 114/26 |
| 2,635,406 | 4/1953 | Chauvin | 56/8 |
| 3,884,018 | 5/1975 | Chaplin | 56/9 |
| 4,129,931 | 12/1978 | Carrigan | 29/252 |
| 4,196,566 | 4/1980 | Donnelley | 56/8 |
| 4,646,411 | 3/1987 | Hankins | 29/252 |
| 5,419,027 | 5/1995 | Mcpeak et al. | 29/252 |

*Primary Examiner*—Sherman Basinger
*Attorney, Agent, or Firm*—Andrus, Sceales, Starke & Sawall

[57] ABSTRACT

An aquatic vegetation cutter for clearing dense aquatic vegetation from waterways uses a drive coupling and bearing assembly that eliminates the need for drive shafts to drive the cutting blades. The bearing is preferably capable of supporting a 90,000 pound load and supports the coupling close to the coupling hub where the cutting blade is attached. The bearing is housed in a watertight housing and is lubricated with grease. It is preferred that the output shaft of the motors driving the cutting blades be slanted slightly upward so that the lower part of the cutting blade is forward of the upper part of the cutting blade when the cutting blade is rotated, thereby reducing the load on the motor under normal operating conditions. The cutting blades have pitched fins sized so that each blade provides substantially the same amount of forward thrust for propulsion.

18 Claims, 6 Drawing Sheets

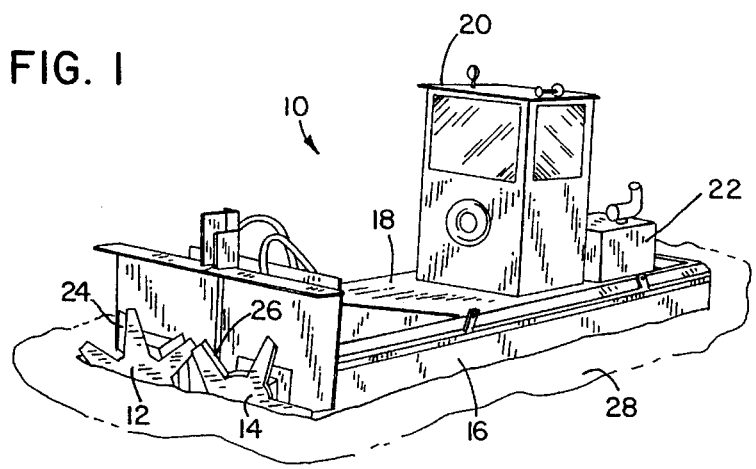
FIG. 1
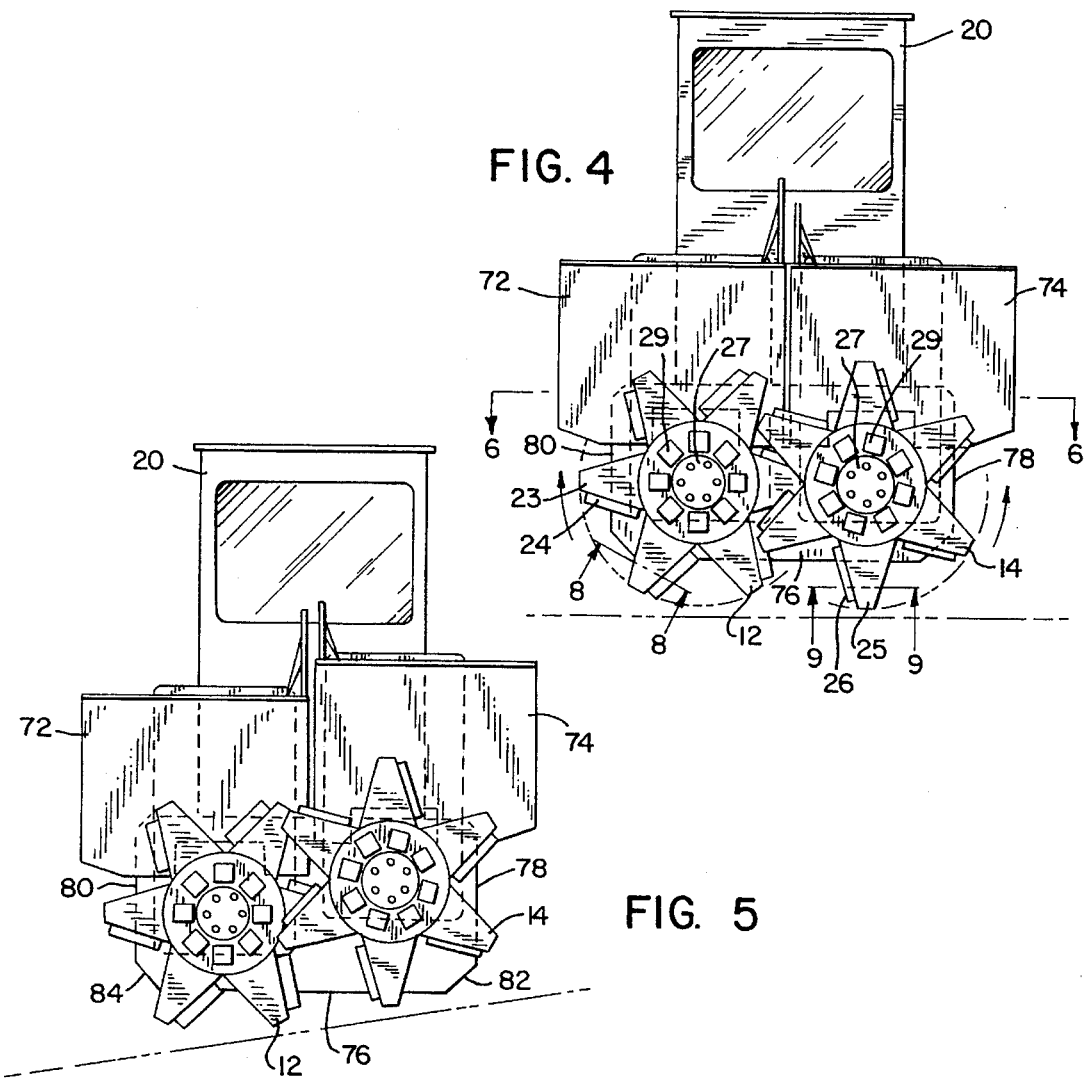
FIG. 4
FIG. 5

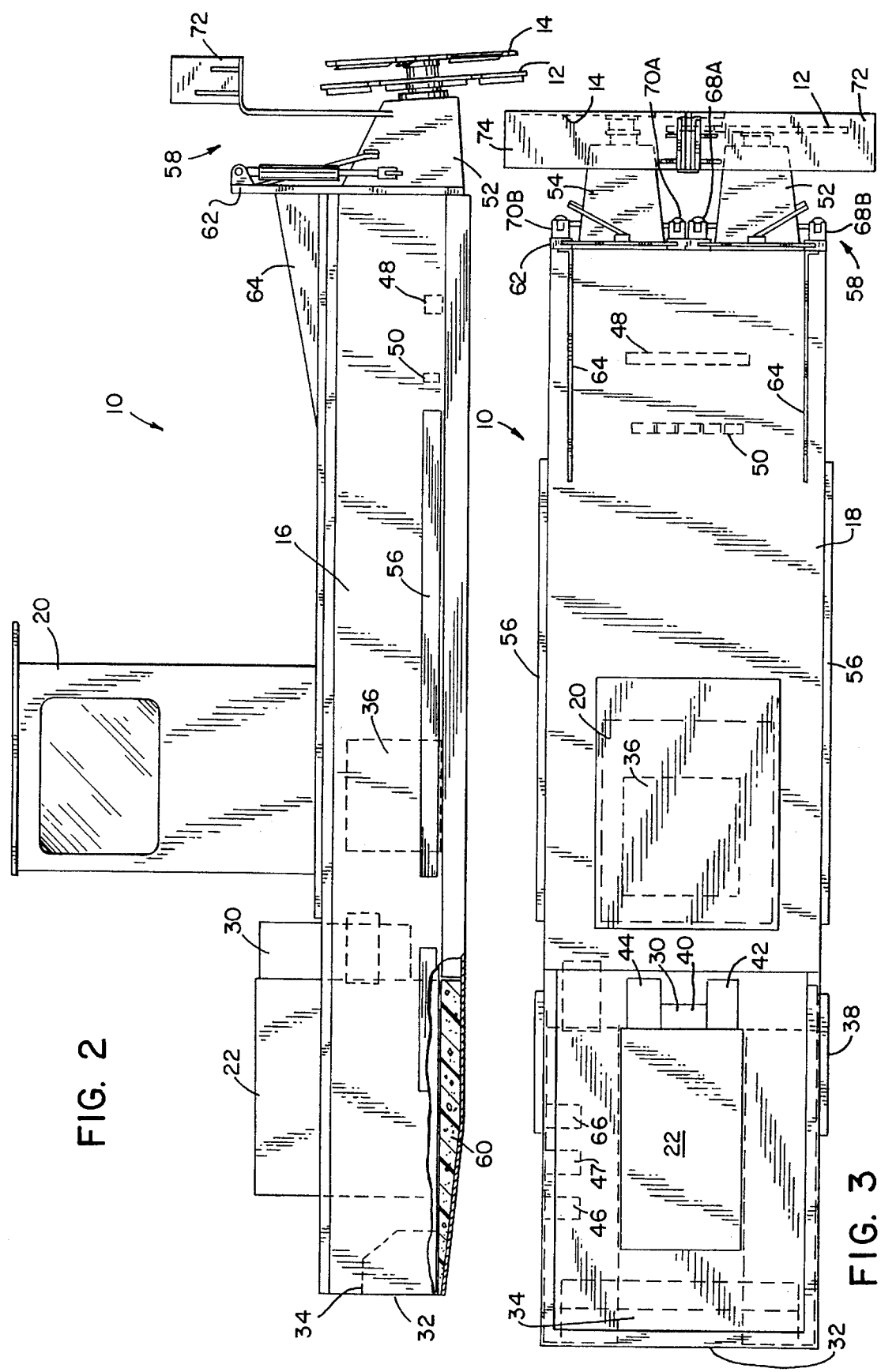

FIG. 13
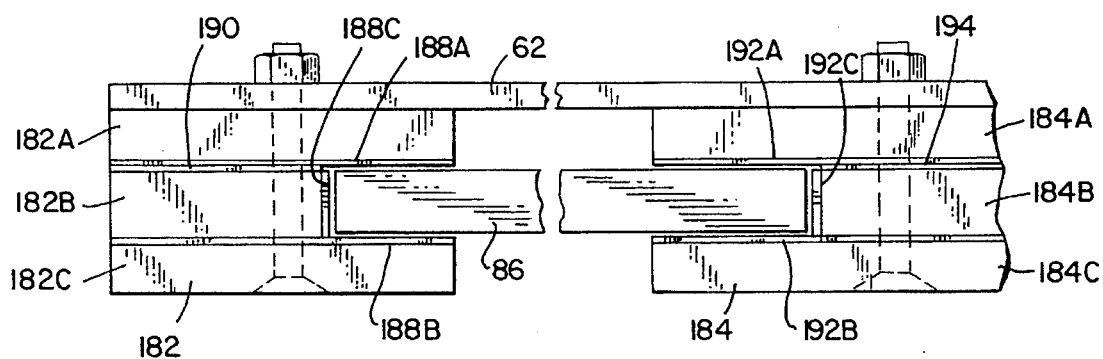
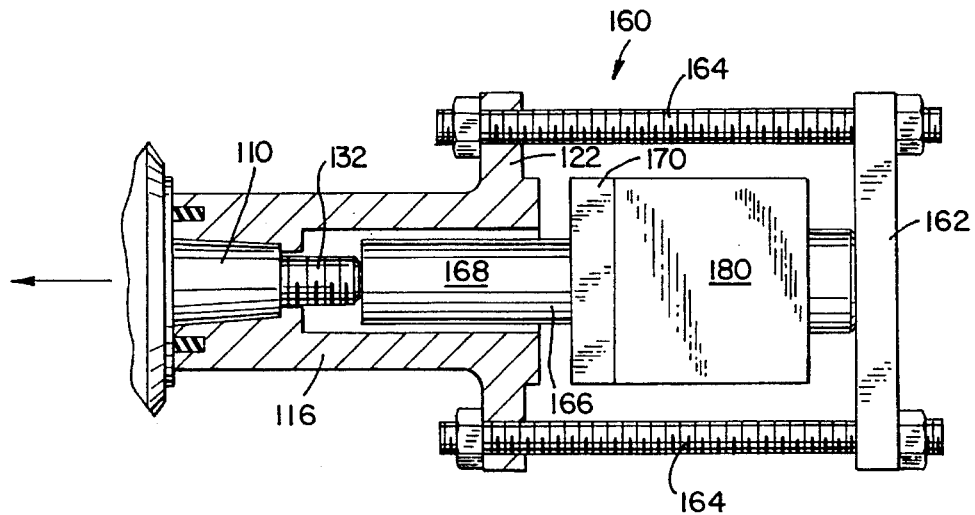
FIG. 14

5,551,900

AQUATIC VEGETATION CUTTER

FIELD OF THE INVENTION

The invention relates to aquatic vegetation cutters used to clear dense aquatic vegetation from waterways. The invention can be used to relieve restrictions to water flow or open waterways for navigation, and is particularly useful for cutting canals, opening marshes, or providing irrigation.

BACKGROUND

Typical aquatic vegetation harvesters are not particularly well suited for clearing tightly matted aquatic vegetation, or aquatic vegetation having thick roots or stems. One type of aquatic vegetation cutter designed for clearing dense aquatic vegetation is disclosed in U.S. Pat. No. 4,196,566. The system disclosed in the '566 patent has two vertical rotary cutting blades, each attached to a drive shaft extending from a bow of a barge. The rotary cutting blades cut vegetation as the barge moves forward, and also cuts root systems while tearing through the subsoil.

In areas of the world where climates are conducive to dense vegetation growth, high-powered aquatic vegetation cutters are needed to control overgrown aquatic vegetation in waterways. The drive shafts for the cutter blades encounter tremendous loads in the prior art aquatic vegetation cutter. The drive shafts therefore tend to break or bend during long term operation. Since the drive shafts typically rotate at a relatively high revolution rate (e.g. 200–300 rpm), a bent drive shaft can quickly destroy motors or any bearings that may support the drive shaft. The likelihood of bending or breaking the drive shaft in the prior art system increases greatly when the power of the aquatic vegetation cutter is increased to cut aquatic vegetation that is more difficult to cut.

SUMMARY OF THE INVENTION

The invention provides a high-powered aquatic vegetation cutter that is durable enough to withstand long term cutting operations in dense and difficult to cut aquatic vegetation.

In one aspect, the invention provides a mounting system for the cutting blades which eliminates the need for drive shafts which as mentioned above, have a tendency to fail under load. The invention replaces drive shafts with heavy duty couplings supported by heavy duty bearings. The bearing assembly is preferably housed in a greased watertight housing to improve long term durability. The bearings provide support to the coupling close to the hub where the cutting blades are attached, thus reducing the risk of damage to the coupling due to excessive blade loads.

In another aspect, the invention uses cutting blades slanted slightly upward so that the lower part of the cutting blade is forward of the upper part of the cutting blade when the cutting blade is being rotated. The upward slant on the cutting blades allows the lower portion of the cutting blades to cut the stems or roots of vegetation before the other parts of the blades encounter that particular vegetation. The slanted cutting blade configuration can reduce the load on the cutting blades.

The invention also uses heavy duty steel cutting blades having teeth with pitched fins for propulsion. The surface area of the fins on the cutting blade located closest to the bow of the boat have a larger surface area than the fins on the other blade. The difference in fin surface area tends to equalize the forward propulsion thrust between the blades. Each of the blades is balanced and the cutting edges of the blades are preferably hardened by arc welding with a hard surfacing rod to provide a hard, dull cutting surface. Thus, preferred cutting blades tear the vegetation with brute force.

The invention also contemplates a hull shaped so that the hull is completely within the path of the cutting blades, even when the cutting blades are raised to the uppermost position. This minimizes the chance of the boat being hung up on obstructions during operation.

Other features and advantages of the invention will be apparent to those skilled in the art upon revealing the drawings and the description of the drawings.

BRIEF DESCRIPTION OF THE DRAWINGS

FIG. 1 is a perspective view of an aquatic vegetation cutter in accordance with the invention;

FIG. 2 is a side elevational view of the aquatic vegetation cutter shown in FIG. 1;

FIG. 3 is a top plan view of the aquatic vegetation cutter shown in FIG. 1;

FIG. 4 is a front elevational view of the aquatic vegetation cutter shown in FIG. 1;

FIG. 5 is another front elevational view of the aquatic vegetation cutter of FIG. 1 showing one of the cutting blades in a raised position;

FIG. 13 is a detailed drawing showing a mounting configuration for the motor box shown in FIG. 11 to the bow of the aquatic vegetation cutter boat;

FIG. 14 is a side elevational view of a tool used to remove a cutting blade from a drive coupling in the aquatic vegetation cutter of FIG. 1.

DETAILED DESCRIPTION OF THE DRAWINGS

Figure 6:
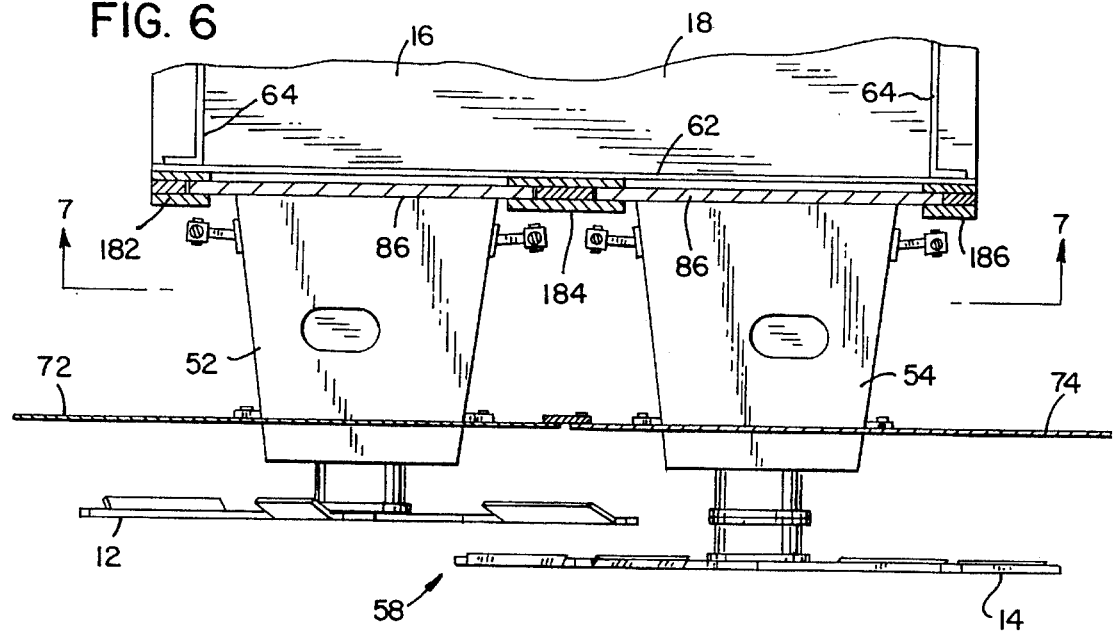
FIG. 6 is a sectional view taken along lines 6—6 in FIG. 4.

Referring now to the drawings and in particular to FIG. 1, the aquatic vegetation cutter, shown generally as 10, includes cutting blades 12 and 14 mounted forward of the bow of a boat 16. The cutting blades 12 and have teeth 23 and 25 that are slightly pitched, and have pitched fins 24 and 26 attached to the teeth 23 and 25 to propel the boat 16 through water 28.

The boat 16 has a deck 18, which supports an enclosed pilot house or cab 20. A diesel engine 22 located towards the stern 32 of the boat 10 provides power to rotate cutting blades 12 and 14.

Referring to FIGS. 2 and 3, the diesel engine 22 drives an hydraulic pump assembly 30, which in turn provides power to the cutting blades 12 and 14 through a user controlled hydraulic drive system. The preferred diesel engine is capable of providing output at 234 horsepower. While the aquatic vegetation cutter 10 probably does not need this much power under normal operation, it is desirable to have excess power available for difficult cutting conditions. Using an upsized engine 22 also enhances engine durability. The preferred engine 22 is a radiator-cooled diesel engine, although water-cooled or gasoline engines may be suitable depending on the application.

The engine 22 is located ahead of an hydraulic fluid reservoir 34. The hydraulic fluid reservoir 34 extends essentially along the transom 32 of the boat 16.

A fuel tank 36 is located in the hull of the boat 16 underneath the pilot house 20. Diesel fuel recirculated from the diesel engine 22 and returned to the fuel tank 36 is water cooled by diesel fuel cooling tubes 38 located on the starboard side of the boat 16 outside of the hull. The hydraulic pump assembly 30 includes a pump gear drive 40 and independently controlled hydrostatic pumps 42 and 44. The hydrostatic pump 42 drives the right hand cutter blade 12. The hydrostatic pump 42 pumps hydraulic fluid through a dual filter system, shown schematically as 46, and outputs pressurized hydraulic fluid through a line mounted to hydraulic line mount 48. Likewise, hydrostatic pump 44 pumps hydraulic fluid from the reservoir 34 through dual filter system 47, and outputs pressurized hydraulic fluid through another line which is mounted to hydraulic line mount 48. Crossover or bypass pressure relief valves are provided at hydraulic mount 48. After the pressure relief valve, the hydraulic line from hydrostatic pump 42 continues to a hydraulic motor 51 (FIG. 10) mounted in motor box 52. The hydraulic motor 51 in motor box 52 drives cutting blade 12. Likewise, the hydraulic line from hydrostatic pump 44 continues after the pressure relief valve to a hydraulic motor (not shown but preferably identical to motor 51) located in motor box 54. The hydraulic motor located in motor box 54 drives cutting blade 14. Return lines from the hydraulic motors in boxes 52 and 54 pass the return hydraulic fluid to an hydraulic fluid return manifold 50. The hydraulic fluid return manifold equalizes the return pressure of the hydraulic fluid. After leaving the hydraulic return manifold 50, the hydraulic fluid is cooled by passing the fluid through hydraulic cooling tubes 56 located on both the port and starboard sides of the boat 16 outside the hull.

The front cutting assembly shown generally as 58 is extremely heavy. A concrete ballast 60 is therefore provided in the aft portion of the hull by the stern 32 of the boat 16 so that the boat 16 floats level in water. The weight of the front cutting assembly 58 also requires that the hull of the boat have sufficient strength or reinforcement. Also, the bow 62 needs to be stiffened and reinforced to support the front cutting assembly. Support members 64 are mounted to the deck 18 against the front bow plate 62 for reinforcement.

The diesel engine 22 has an auxiliary hydraulic pump (not shown). The auxiliary hydraulic pump pumps hydraulic fluid from the reservoir 34 through an auxiliary filtering system 66 and provides pressurized hydraulic fluid to raise or lower the cutting blades 12 and 14. Lift cylinders 68a and 68b raise and lower cutting blade 12, and lift cylinders 70a and 70b raise and lower cutting blade 14. Return fluid from cylinders 68a and 68b, and 70a and 70b, inputs the return manifold 50.

Splash guards 72 and 74 help keep the splash from blades 12 and 14 from obstructing the view of a driver in the pilot house 20. As shown in FIG. 2, splash guard 72 is attached to motor box 52 so that the splash guard 72 is raised and lowered with the cutting blade 12. Splash guard 74 is mounted to motor box 54 in the same manner.

Referring to FIGS. 4 and 5, the boat 16 is propelled forward by counterrotating cutting blades 12 and 14. To propel forward, blade 12 is rotated so that fins 24 trail teeth 23 and water and cut vegetation are thrown to the starboard side of the boat 16. Blade 14 is rotated so that fins 26 trail teeth 25 and water and cut vegetation are thrown to the port side of the boat 16. To propel the boat 16 in reverse, the blades 12 and 14 rotate in the opposite directions. The boat 16 can be turned by adjusting the relative rotation speed of the blades 12 and 14, and can be turned sharply by rotating the blades 12 and 14 in the same direction.

The hull of the boat 16 is generally rectangular with a flat horizontal bottom 76, a vertical port side 78 and a vertical starboard side 80. The hull is sized such that the hull does not extend beyond the path of the rotating cutting blades 12 and 14 when the aquatic vegetation cutter 10 is moving in the forward direction. FIG. 4 shows both of the cutting blades 12 and 14 in the lowermost cutting position. In this position, the cutting path of the blades is about 8 feet by 3 feet. FIG. 5 shows cutting blade 14 raised to the uppermost cutting position. The interface 82 between the bottom side 76 and the port side 78 of the hull is beveled. The beveled interface 82 ensures that the hull does not extend beyond the path of cutting blade 14 even when the blade is raised in the uppermost position. See FIG. 5. Likewise, the interface 84 between the bottom side 76 and the starboard side 80 is beveled to ensure that the hull does not extend beyond the path of cutting blade 12 when the cutting blade 12 is in the uppermost position.

In normal operation, it is usually desirable that the blades 12 and 14 be positioned in the lowermost position. However, in shallow conditions it may be desirable to raise one or both of the blades to improve control of the boat 16, or to adjust the level at which the blades 12 and 14 tear through the subsoil. FIG. 5 illustrates a method of operation in which the left hand side cutting blade 14 is raised and the right hand side cutting blade 12 is lowered. This operating configuration may be desirable when cutting near a bank or shoreline.

Except for the size of the fins 24 and 26, the blades 12 and 14 are preferably mirror images of each other. Each of the blades 12 and 14 is preferably made of ½ inch mild steel. Each blade 12 and 14 also preferably has a hub 27 made of ½ inch mild steel, and plate stiffeners 29 surrounding the hub 27 also made of ½ inch mild steel. The plate stiffeners 29 are preferably sized to balance the blades during obstruction free rotation.

Figure 8:
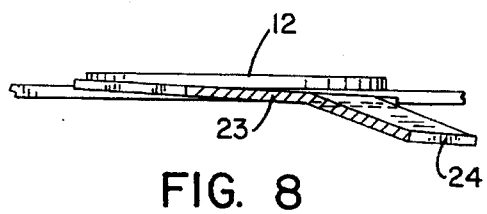
FIG. 8 is a sectional view taken along lines 8—8 in FIG. 4.
Figure 9:
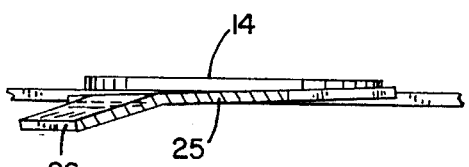
FIG. 9 is a sectional view taken along lines 9—9 in FIG. 4.

Referring to FIGS. 8 and 9, the right hand cutting blade 12 has six slightly pitched teeth 23. The base of the teeth 23 is preferably 12 inches, and the pitch is preferably ½ inch across the back. Each tooth 23 has a more severely pitched fin 24. The fin 24 has a longitudinal length of 12 inches, a transverse length of 2 inches, and the pitch is preferably 1¼ inches. The left hand cutting blade 14 has six slightly pitched teeth 25 which are preferably the mirror images of the teeth 23 on blade 12. Each tooth 25 also has a more severely pitched fin 26 attached to the trailing edge of the tooth 25. The fins 26 on the left hand cutting blade 14 preferably have the same longitudinal length as the fins 24 on the right hand blade 12 and the same pitch angles, but have a transverse length of 1½ inches which is shorter than the fins 24 on the right hand blade 12. The shorter fins 26 on blade 14 help compensate for the fact that the blade 14 is located ahead blade 12.

The cutting edges of blades 12 and 14 are preferably hardened by arc welding with a hard surfacing rod. The hardened cutting edges are dull, rather than sharp. The cutting blades 12 and 14 therefore actually tear vegetation with brute force rather than sever the vegetation with a sharp blade.

It is preferred that the pitch of the teeth 23, 25 on the blades 12, 14 be slight to reduce stress and strain on the blades 12, 14. The fins 24, 26 are provided for propulsion, and are sized to provide an appropriate amount of forward thrust to accommodate cutting operations. It is believed that the increased surface area of the fins 24 on cutter 12 enhance the ability of cutter blade 12 to generate thrust, and thus compensates for the fact that the boat would tend to pull left without such an adjustment.

Figure 11:
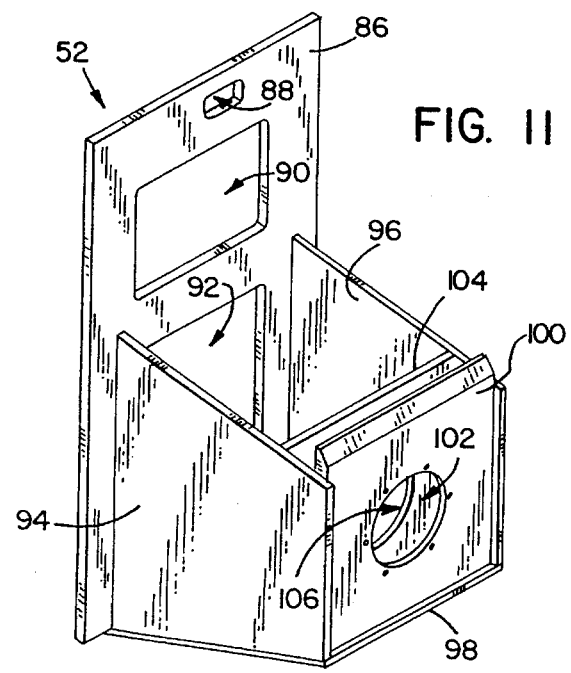
FIG. 11 is a perspective view of a motor box used in the aquatic vegetation cutter of FIG. 1.

FIG. 11 shows a perspective view of motor box 52 without a motor box cover. Motor boxes 52 and 54 are preferably mirror images of one another. The motor box 52 is made out of aluminum, preferably 6061-T6 aluminum. The motor box 52 has a slide plate 86 made of 1 inch thick aluminum. The slide plate 52 is approximately 30 inches wide and approximately 58 inches tall. The slide plate 86 has a small opening 88 and two larger openings 90 and 92. The small opening 88 provides a handle to the motor box 52. The large openings 90 and 92 reduce the weight of the motor box 52. Two side plates 94, 96 and a bottom plate 98, all made of ½ inch aluminum, are welded to the slide plate 86. A bearing support plate 100 is welded to the side plates 94, 96 and the bottom plate 98 towards the front edge of the plates 94, 96, 98. The bearing support plate 100 has a circular forward facing output hole 102. A motor support plate 104 is welded to the side 94, 96 and the bottom 98 plates to the interior of the bearing support plate 100. The motor support plate 104 has a motor support hole 106. The bearing support plate 100 and the motor support plate 104 are preferably made of ¾ inch aluminum.

Figure 10:
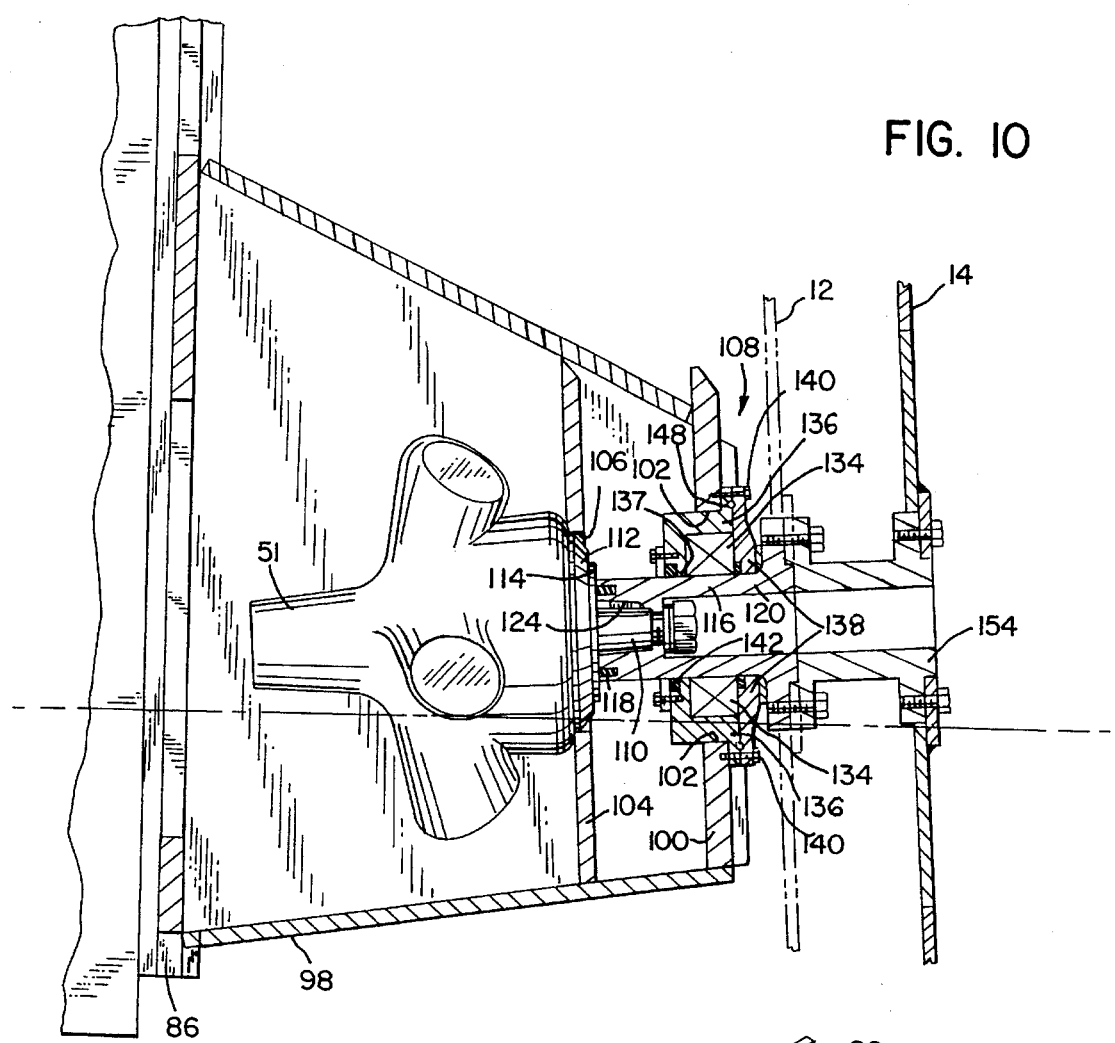
FIG. 10 is a side elevational view with parts broken away of a drive assembly for the aquatic vegetation cutter of FIG. 1.

As can best be seen in FIG. 10, the bottom plate 98 is welded to the slide plate 86 at a slight upward angle above horizontal. The upward slant of bottom plate 98 should be between 4° and 8° above horizontal, and is preferably 5° above horizontal. The bearing support plate 100 and the motor support plate 104 are preferably welded perpendicularly to the bottom plate 98. Because of this slanted configuration, the cutting blades 12 and 14 will be mounted so that the lower part of the cutting blade is forward of the upper part of the cutting blade when the cutting blade is being rotated by the motor. Referring to FIG. 2, it can be appreciated that mounting the motors so that the motor output shaft slants slightly upward, will allow the lower portions of the cutting blades 12 and 14 to make contact with vegetation being cut before other parts of the blade. The upward blade slant reduces the load on blades and on the motors under normal operating conditions, and allows the aquatic vegetation cutter 10 to be more effective in difficult cutting applications. The preferred 5° slant allows the root systems to be cut first, but also allows sufficient blade clearance at the top of the blade (about a 5 inch clearance is preferred). Note that the ballast 60 is designed to level the boat 16 so that the 5° blade slant can be fully utilized during operation.

Figure 12:
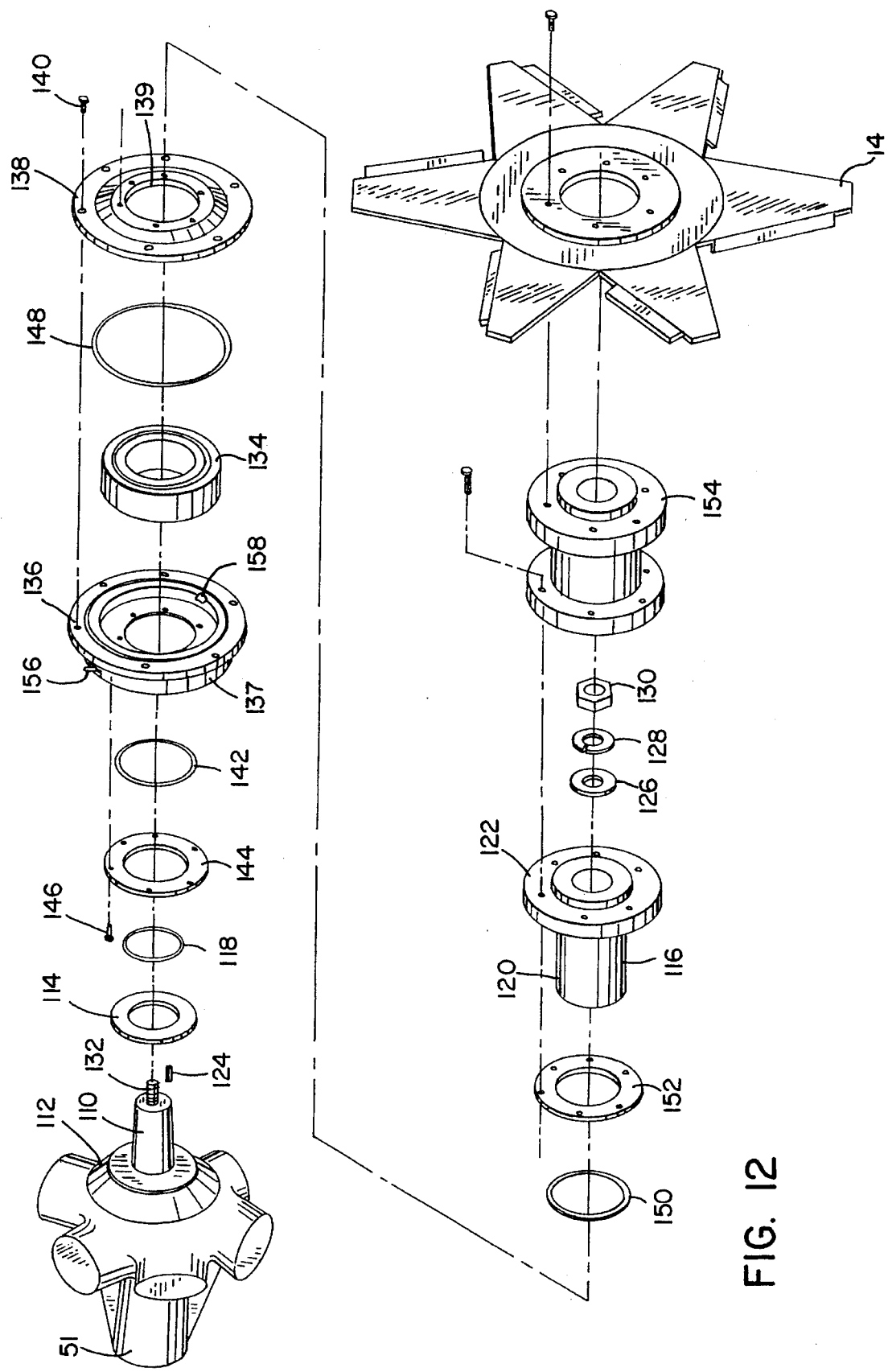
FIG. 12 is an exploded assembly view of the drive assembly shown in FIG. 10.

FIGS. 10 and 12 show the assembly of the hydraulic motor 51 and an associated drive assembly 108. With the exception of extension 154, the motor 51 and drive assembly 108 for motor box 52 are the same as the motor and drive assembly for motor box 54. The hydraulic motor 51 is preferably capable of a maximum speed of 500 rpm and a maximum power output of 85 horsepower, and capable of receiving maximum continuous pressure of 3570 psi. A suitable hydraulic motor 51 is a five cylinder rotary type hydraulic motor with a tapered output shaft 110. The motor 51 has a front mounting shoulder 112, which is inserted into hole 106 in the motor support plate 104. A stainless steel seal guard 114 protects the output shaft seal. A drive coupling 116 is mounted to the tapered output shaft 110. Flax 118 is located in an end groove of the drive coupling 116 to seal between the seal guard 114 and the drive coupling 116 and prevent water from contacting the output shaft 110.

The drive coupling 116 has an axle 120 and a hub 122. The axle 120 of the drive coupling 116 is operatively connected or mounted to the tapered output shaft 110. The axle 120 has an output shaft recess that receives the output shaft 110. A key 124 can be used to align the axle 120 on the output shaft 110. The drive coupling 116 is tightened to the output shaft 110 by tightening washers 126 and 128 and nut 130 to a threaded stem 132 on the output shaft. Although the coupling 116 is attached to the output shaft with a key 124 and nut 130, the fit of the drive coupling recess onto the output shaft 110 is preferably very tight, so that the key 124 need not bear a significant load. Impacting the drive coupling 116 may be required to mount the coupling 116 onto the drive shaft 110. Cutter blade 12 is attached to the hub 122 of the drive coupling 116. Cutting blade 14 is attached to a hub on extension 154 which is attached to the hub 122 of drive coupling 116.

The drive coupling 116 is designed to encounter high torsional loads without failure. The outer diameter of the axle 120 of the drive coupling 116 is preferably 4.33 inches. It is preferred that the interface between the axle 120 and the hub 122 be rounded at a ⅜ inch radius. The hub 122 is preferably 1 inch thick, and the preferable length of the entire drive coupling 116 is under 9 inches. Mounting holes for the cutting blades or spacer are preferably drilled through the hub at a 7½ inch diameter.

A heavy duty bearing 134, capable of withstanding at least 50,000 pounds of transverse load and preferably capable of withstanding 90,000 pounds of transverse load, supports the axle 120 of the drive coupling 116 for rotation through the forward facing output hole 102 in the bearing support plate 100 of the motor box 52. The bearing 134 has substantial axial length (e.g. 2–3 inches) which reduces transverse loads on the motor output shaft 110. The bearing 134 is preferably centered axially across the hole 102 in the bearing support plate 100.

In addition, the heavy duty bearing assembly 108 supports the axle 120 of the drive coupling 116 very near to the hub 122, thus reducing the chance that the axle 120 can bend or break due to transverse loading.

The bearing 134 is housed in a watertight bearing housing comprised of a bearing housing 136 and a housing cover 138 which are mounted to the bearing support plate 100 by screws 140. The bearing housing 136 has a grooved rear edge 137 that receives flax 142 to seal along the axle 120 of the drive coupling 116. The flax 142 prevents water from propagating into the bearing surface between the bearing 136 and the axle 120. The flax 142 is secured with a stainless steel cover plate 144 screwed onto the bearing housing 136 with screws 146. An O-ring 148 seals the interface between the bearing housing 136 and the housing cover 138. Flax and/or lip seal 150 is used to seal an inside edge 139 of the housing cover 138. A cover plate 152 can be used to secure the flax and/or lip seal 150.

The bearing surface between the inside diameter of the bearing 134 and the axle 120 of the drive coupling 116 is preferably lubricated with grease. Grease can be provided through grease nipple 156 in the bearing housing 136. A remote grease line feeds the grease nipple 156. The bearing housing 136 has a grease relief hole 158. The combination of the watertight bearing housing and the grease lubrication protects the bearing 134 from water and other contaminates that can cause abrasion in the long term.

The bearing 134 is not press fit into the bearing housing 136, but a clearance is provided between the outer circumferential surface of the bearing 134 and the bearing housing 136 to allow for thermal expansion. The preferred clearance is five one-thousandths of an inch.

FIG. 14 shows a tool 160 for removing the drive coupling 116 from the output shaft 110. The tool 160 has a top plate 162 that is positioned generally parallel to the drive coupling hub 122. Six threaded rods 164 connect the top plate 162 to the hub 122 of the drive coupling so that the top plate 162 is generally parallel to the hub 122 yet spaced from the hub 122. The rods 164 are preferably 12 inches long. The tool 160 also has a slide piston 166 with an elongated cylindrical ram 168 that pushes against the threads 132 of the output shaft 110 and a head 170 that receives axial pressure from an expandable ram 180. The expandable ram 180 preferably has a 2 inch stroke and is capable of providing 50 tons of force. To remove the drive coupling 116 from the output shaft 110, the expandable ram 180 is actuated to pull the drive coupling hub 122 via threaded rods 164 thus removing the coupling 116 from the output shaft 110.

Figure 7:
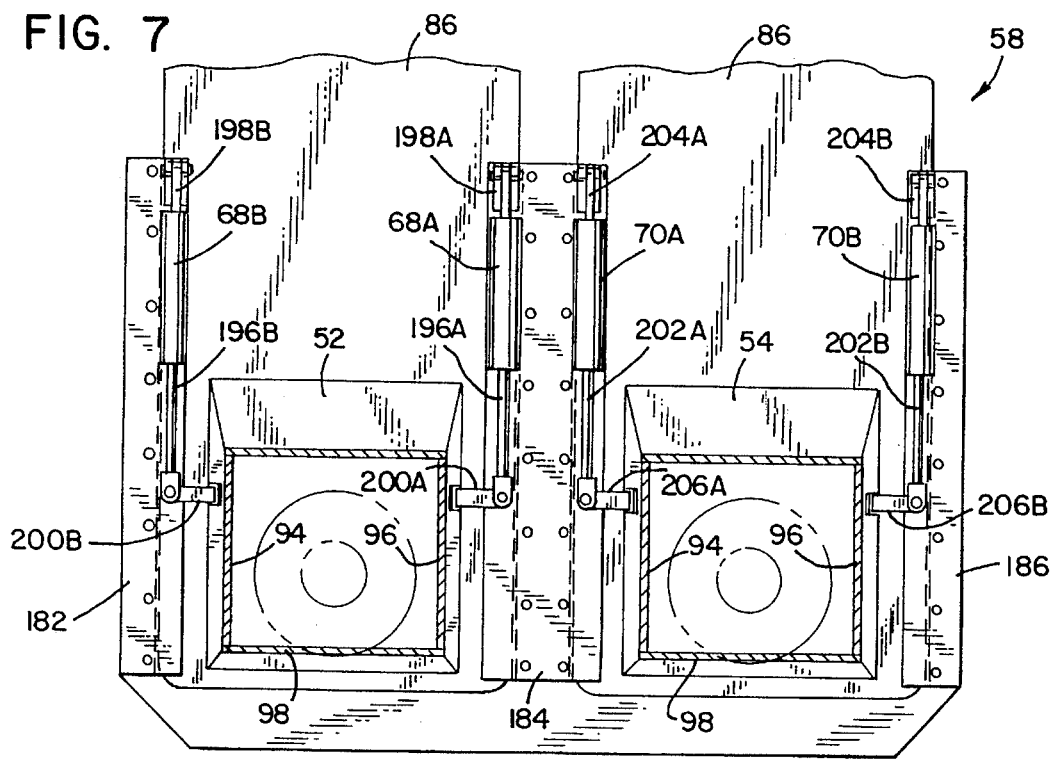
FIG. 7 is a sectional view taken along lines 7—7 in FIG. 6.

Referring now to FIGS. 6, 7 and 13, the slide plate 86 for each motor box 52 and 54 is slidably mounted to the bow plate 62 of the boat 16, with mounting brackets 182, 184 and 186. The brackets 182, 184 and 186 are each 48 inches long. FIG. 13 shows brackets 182 and 184 for slidably mounting motor box 52. The brackets are made by screwing aluminum plates 182a, 182b, 182c and 184a, 184b and 184c respectively to bow plate 62. Fourteen gauge stainless steel shims 188a and 188b (48 inches long), as well as a 48 inch stainless steel bar having a ¼ inch thickness 188c, are attached to aluminum plates 182a, 182b and 182c to provide a stainless steel contact surface for the aluminum slide plate 86. A 14 gauge stainless steel shim 190 is provided between aluminum plates 182a, 182b for spacing. Likewise, 14 gauge shims 192a and 192b (48 inches long), as well as a 48 inch stainless steel bar with a ¼ inch thickness 192c, provide a stainless steel contact surface for the other end of the aluminum slide plate 86. A 14 gauge stainless steel shim 194 is provided between aluminum plates 184a and 184b for spacing. Because the contact surface between the brackets 182, 184 and the aluminum slide plate 86 for the motor box is one of dissimilar metals, there is improved lubricity when the contact surface wettens. Motor box 54 is slidably mounted to brackets 184 and 186 in the same manner.

Referring now in particular to FIGS. 6 and 7, hydraulic cylinders 68a and 68b each receive regulated hydraulic pressure at an equal rate to raise and lower the motor box 52. The pistons or rams 196a, 196b preferably have a 32 inch stroke. The cylinders 68a, 68b are attached to the mounting plates 184, 182 via brackets 198a, 198b. The rams or pistons 196a and 196b are connected to the motor box 52 via brackets 200a, 200b. In a similar manner, cylinders 70a and 70b raise and lower motor box 54 via piston rod or rams 202a, 202b. The cylinders 70a and 70b are attached to mounting plates 184 and 186 by brackets 204a, 204b. The piston rods or rams 202a, 202b preferably have a stroke of 32 inches and are attached to motor box 54 by brackets 206a, 206b.

While the invention has been described herein with respect to its preferred embodiment, it should be recognized that the invention is not limited thereto. Many modifications, variations and equivalents apparent to those skilled in the art should be considered to be within the scope of the following claims.

We claim:

1. An aquatic vegetation cutter comprising:
    a boat that floats in water having a hull with a horizontal plane therethrough and having a bow;
    a motor mounted forward of the bow having an output shaft which slants slightly upward as the output shaft extends forward of the bow; and
    a cutting blade only partially submerged in the water, the cutting blade being mounted to the output shaft in a plane normal to a longitudinal axis of the output shaft so that the lower part of the cutting blade is forward of the upper part of the cutting blade when the cutting blade is being rotated by the motor output shaft;
    wherein the motor and the cutting blade are movable only in a direction substantially perpendicular to the horizontal plane through the hull of the boat, and an attitude of the longitudinal axis of the output shaft remains fixed with respect to the horizontal plane through the hull of the boat.

2. An aquatic vegetation cutter as recited in claim 1 wherein the motor output shaft slants slightly upward at an angle between 4° and 8° above horizontal.

3. An aquatic vegetation cutter as recited in claim 1 wherein a ballast is located within the boat near the stern of the boat.

4. An aquatic vegetation cutter comprising:
    a boat having a bow;
    a motor box slidably mounted to the bow, the motor box having a forward facing output hole;
    a motor mounted in the motor box having an output shaft projecting forward from the motor towards the output hole in the motor box;
    a drive coupling having a hub located outside of the motor box and an axle extending through the output hole and connected to the output shaft;
    a bearing in the forward facing output hole of the motor box supporting the drive coupling axle; and
    a cutting blade attached to the drive coupling hub.

5. An aquatic vegetation cutter as recited in claim 4 wherein the bearing can withstand a transverse load of at least 50,000 lbs.

6. An aquatic vegetation cutter as recited in claim 4 wherein the bearing is centered axially in the forward facing output hole of the motor box.

7. An aquatic vegetation cutter as recited in claim 6 further comprising a bearing housing having a grease relief hole.

8. An aquatic vegetation cutter as recited in claim 6 further comprising a bearing housing wherein clearance is provided between an outer circumferential surface of the bearing and the bearing housing to allow for thermal expansion.

9. An aquatic vegetation cutter as recited in claim 4 wherein the bearing has an axial thickness sufficient to reduce transverse loads on the motor output shaft.

10. An aquatic vegetation cutter as recited in claim 4 wherein the motor box further comprises an interior motor support plate having a motor support hole through which the motor is mounted for support.

11. An aquatic vegetation cutter as recited in claim 4 further comprising a watertight bearing housing assembly that is attached to the motor box and prevents water from entering a bearing surface between the bearing and the drive coupling axle.

12. An aquatic vegetation cutter as recited in claim 4 wherein the motor output shaft is tapered.

13. An aquatic vegetation cutter as recited in claim 4 further comprising a drive coupling axle extension which attaches to the hub of the drive coupling and has an extension hub to which the cutting blade is attached.

14. An aquatic vegetation cutter as recited in claim 4 wherein the motor box has a slide plate which is slidably mounted in a mounting bracket attached to the bow of the boat, and surfaces of the mounting bracket that can be in contact with the slide plate of the motor box are made of a metal that is dissimilar to the material of the motor box slide plate.

15. An aquatic vegetation cutter comprising:

a boat having a bow;

a first motor mounted forward of the bow having an output shaft;

a first cutting blade mounted to the output shaft of the first motor, the first cutting blade being a generally circular rotatable blade having a plurality of teeth spaced along the circumference of the blade and extending radially outward, each tooth having a pitched fin attached thereto;

a second motor mounted forward of the bow having an output shaft; and a second cutting blade mounted to the output shaft of the second motor, the second cutting blade being a generally circular rotatable blade having a plurality of teeth spaced along the circumference of the blade and extending radially outward, each tooth having a pitched fin attached thereto;

wherein the second cutting blade is located closer to the bow than the first cutting blade, and the fins on the second cutting blade have more surface area than the fins on the first cutting blade.

16. An aquatic vegetation cutter as recited in claim 15 wherein each blade has a hardened, dull cutting edge.

17. An aquatic vegetation cutter as recited in claim 16 wherein the teeth of each blade are slightly pitched.

18. An aquatic vegetation cutter comprising:

a boat;

a port side motor mounted forward of the bow of the boat between the center line and the port side of the boat;

a port side cutting blade mounted to an output shaft of the port side motor, the port side cutting blade being a generally circular rotatable blade having a plurality of teeth spaced along the circumference of the blade and extending radially outward;

a starboard side motor mounted forward of the bow of the boat between the center line and the starboard side of the boat; and a starboard side cutting blade mounted to an output shaft for the starboard side motor, the starboard side cutting blade being a generally circular rotatable blade having a plurality of teeth spaced along the circumference of the blade and extending radially outward;

wherein the boat has a generally rectangular hull with a generally flat bottom, a generally vertical port side and a generally vertical starboard side, and the interface between the bottom side of the hull and the port side of the hull is beveled and the interface between the bottom side of the hull and the starboard side of the hull are beveled so that the hull does not extend beyond the path of the cutting blades when the aquatic vegetation cutter is in operation.

* * * * *